United States Patent [19]
Calcagno et al.

[11] 3,779,943
[45] Dec. 18, 1973

[54] PROCESS FOR REACTIVATING AN ALUMINIUM TRICHLORIDE CATALYST

[75] Inventors: Benedetto Calcagno; Marcello Ghirga; Lucio Di Fiore, all of Milan, Italy

[73] Assignee: Societa' Italiana Resine S.p.A., Milan, Italy

[22] Filed: Sept. 20, 1971

[21] Appl. No.: 182,256

Related U.S. Application Data

[63] Continuation of Ser. No. 841,844, July 15, 1969, abandoned.

[30] Foreign Application Priority Data

July 22, 1968   Italy.............................. 19272 A/68

[52] U.S. Cl............................ 252/411 R, 260/671 B
[51] Int. Cl........................ B01j 11/80, C07c 0/356
[58] Field of Search............................ 252/411, 424; 208/13; 260/683.57, 683.67, 683.74, 671 B, 683.77; 423/130, 135

[56]   References Cited
UNITED STATES PATENTS

| | | | |
|---|---|---|---|
| 2,485,050 | 10/1949 | Hepp et al...................... | 260/683.57 |
| 2,526,564 | 10/1950 | Hepp et al......................... | 423/130 |
| 2,701,181 | 2/1955 | Kilpatrick........................... | 423/130 |
| 2,797,981 | 7/1957 | Tooke.................................. | 208/13 |
| 1,460,110 | 6/1923 | Owen.................................. | 423/130 |

*Primary Examiner*—Daniel E. Wyman
*Assistant Examiner*—P. E. Konopka
*Attorney*—Mion, Zinn & Macpeak

[57]   ABSTRACT

The liquid aluminium trichloride-hydrocarbon complex formed from a catalytic process is reactivated by instantaneously vaporizing it under conditions such as to form no more than 25 wt. percent of normally gaseous products, e.g., at atmospheric pressure and 300° to 500° C, and the vaporized products are condensed and the normally liquid catalytic products are recovered. The complex can be used for catalysing the alkylation of benzene with propylene tetramer.

2 Claims, 1 Drawing Figure

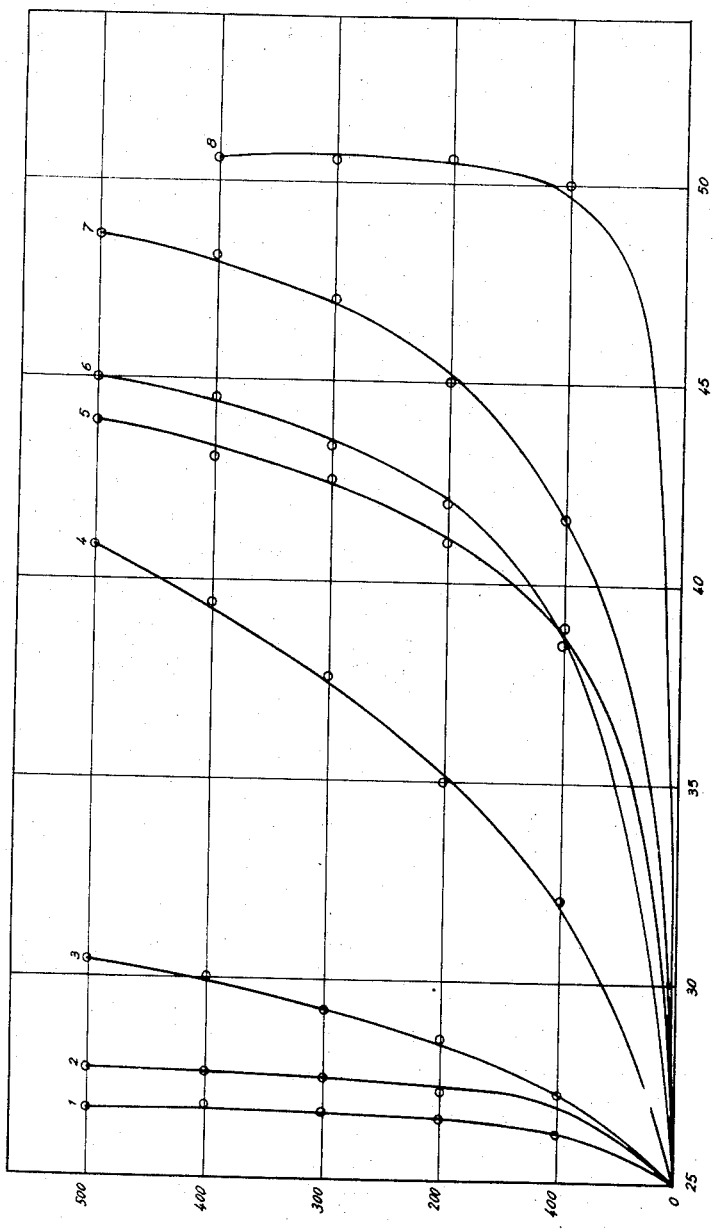

PROCESS FOR REACTIVATING AN ALUMINIUM TRICHLORIDE CATALYST

This application is a continuation of (including streamline) Ser. No. 841,844, filed 7/15/69, now abandoned.

This invention relates to the reactivation of catalyst complexes obtained from the catalysis of hydrocarbons with aluminum trichloride.

It is known to catalyse various industrial reactions such as isomerisation and alkylation of hydrocarbons by means of aluminum trichloride, which forms complexes with hydrocarbons during the reaction These complexes, which are liquid, are regularly removed from the reaction medium, activated by addition of fresh aluminum trichloride, and then returned to the reaction; in order to maintain the amount of catalyst constant, a portion of the inactivated complex is withdrawn, continuously or intermittently, from the reaction system.

The invention is concerned with the treatment of these withdrawn portions of catalyst complex. Previously, the complexes have been treated so as to recover either the aluminium trichloride or the hydrocarbon moiety. The hydrocarbons may be recovered by dissolving them out of the complex with water however, the recovered material is of little value. The aluminium trichloride is recovered by subjecting the complex to high temperature to decompose it and volatilise the trichloride which is then recovered as solid. However, this latter process is not satisfactory because the aluminium trichloride is only partially recovered, obstructions easily occur in the apparatus due to the presence of normally solid products, and because elaborate apparatus is required.

SUMMARY OF THE INVENTION

It has now been found that the aforesaid complexes, which are fluid, contain at least 20 percent by weight of aluminium trichloride, and have been inactivated by hydrocarbon reactions such as alkylation or isomerization, can be reactivated without separation of the complex into its hydrocarbon and chloride parts.

By the process of the invention the spent catalytic complexes are fed to a medium maintained at a temperature such as to effect the instantaneous vaporization of a quantity amounting to 80 percent by weight at least with respect to the feed, and cool the vapors in order to separate the normally gaseous products from the condensable products, the latter representing the reactivated catalytic complex. The conditions of treatment must be such as to form a quantity of normally gaseous products not exceeding 25 percent by weight with respect to the exhausted fluid submitted to treatment.

The mechanism by which the spent catalytic fluids are regenerated by the process of the invention is not known. Probably, a contribution to reactivation is made both by removal from the complex of the sulphur compounds through the gaseous products evolved in treatment, and by removal through the vaporization residue of the degradation products of aluminium trichloride forming, for instance, owing to traces of water normally present in the reaction medium. Moreover, such complexes of aluminum chloride with hydrocarbons are probably decomposed, which are particularly stable, and hence are catalytically inactive.

In any case, the reactivated complexes obtained by this process are of an extremely high activity, such that they can be directly utilized in reactions catalyzed by aluminium trichloride and in quantities lower than those normally employed in the art.

DESCRIPTION OF THE PREFERRED EMBODIMENTS.

In carrying out the process, the vaporization is preferably carried out at atmospheric pressure, though vacuum or pressures of a few atmospheres can be employed. At atmospheric pressure, the vaporization temperatures are 300° to 500° C. Below 300° C, pitchy residual products are formed, so that only partial recovery is effected; above 500° C, excessively high quantities of products which are gaseous under normal conditions are formed.

It has been found that by operating under the above-mentioned conditions the aluminium chloride is present only in traces in the vaporization residues, which indicates a practically complete recovery of the catalyst. Further advantages of the process according to the invention are its simplicity and inexpensiveness.

The process requires simple apparatus and, as a result of the absence of aluminium trichloride in a solid phase, drawbacks due to blocking or obstructions are avoided in the effluent from the vaporization medium.

In the following examples the activities of various catalysts were evaluated by the following procedure. A shaker reactor was charged at a temperature of 25° C with 200 ml benzene and 40 ml propylene tetramer. The catalyst to be tested was then added, in amount such that the aluminium trichloride content was 2g. The reactor was then operated and after every 100 shakes thereof the temperature of the contents was noted. The higher the temperature obtained, the greater the catalyst activity in catalysing the alkylation of benzene by the tetramer.

The results of the activity tests are plotted in the single figure of the accompanying drawing, wherein the abscissa represents the number of shakes of the reactor and the ordinate represents the temperature in ° C.

Comparative Examples 1 to 4

The activity was determined of the following prior art catalysts;

Example 1: the spentcatalyst from the alkylation of benzene with propylene tetramer in the manufacture of branched dodecyl benzene.

Example 2: the catalyst of Example 1 which was activated by addition of 2g fresh aluminium trichloride, representing 10 percent by weight of the spent complex.

Example 3: the complex obtained from 2g aluminium trichloride in 5ml benzene and 5ml tetramer.

Example 4: 2g aluminum trichloride alone.

The activities of these catalysts is plotted in Curves 1 to 4 respectively of the drawing.

The following examples illustrate the invention.

Examples 5 to 8

The deactivated catalyst obtained as in Example 1 was fed to a laboratory ball mill reactor at the rate and in the total amount stated in the table below; the reactor was heated by a direct flame to the stated temperature. The vaporised products from the mill were condensed and the condensable products recovered as distillate; the residue from the mill, containing aluminium (chiefly as alumina and aluminium oxychloride) was also recovered. The alumina contents of the distillate and residue were determined, and the activity of the distillate was determined by the procedure described above. The reaction conditions and results were as follows.

| Example No. | 5 | 6 | 7 | 8 |
|---|---|---|---|---|
| Feed rate of complex (ml/hr) | 350 | 400 | 300 | 300 |
| Total feed of complex (g.) | 700 | 1,295 | 1,260 | 465 |
| Al content of complex (%) | 6.0 | | 6.2 | 5.5 |
| Vaporisation temperature (%) | 450° | 350° | 350° | 300° |
| Distillate recovered (g.) | 462 | 848 | 870 | 350 |
| AlCl₃ content of distillate (g.) | 120 | 240 | 281 | 105 |
| Residue recovered (g.) | 110 | | 188 | 90 |
| Al content of residue (g.) | 18 | | 21 | 4 |
| Activity curve No. for distillate | 5 | 6 | 7 | 8 |

It will be seen from the drawing that all the catalysts reactivated by the process of the invention (curves 5 to 8) had higher activities than the prior art catalysts.

What is claimed is:

1. In a process for reactivating a liquid complex formed from aluminum trichloride and hydrocarbons, said complex containing at least 20 percent by weight of aluminum trichloride, and becoming inactive after its catalytic use in the catalytic alkylation of hydrocarbons, the improvement which consists of:
   a. subjecting the inactivated complex to instantaneous vaporization at atmospheric pressure and a temperature ranging from 300° to 500° C., so as to vaporize at least 80 percent by weight, of the complex so treated, and
   b. recovering the normally liquid products, containing reactivated aluminum trichloride hydrocarbon liquid complex, by condensing the resulting vapors, the normal gaseous products formed being present in an amount not exceeding 25 percent by weight of the complex treated, said recovered reactivated aluminum trichloride/hydrocarbon liquid complex catalyst being recycled back to said alkylation process.

2. The process of claim 1, in which said process is carried out in a ball-mill reactor, heated externally.

* * * * *